United States Patent Office 3,008,346
Patented Nov. 14, 1961

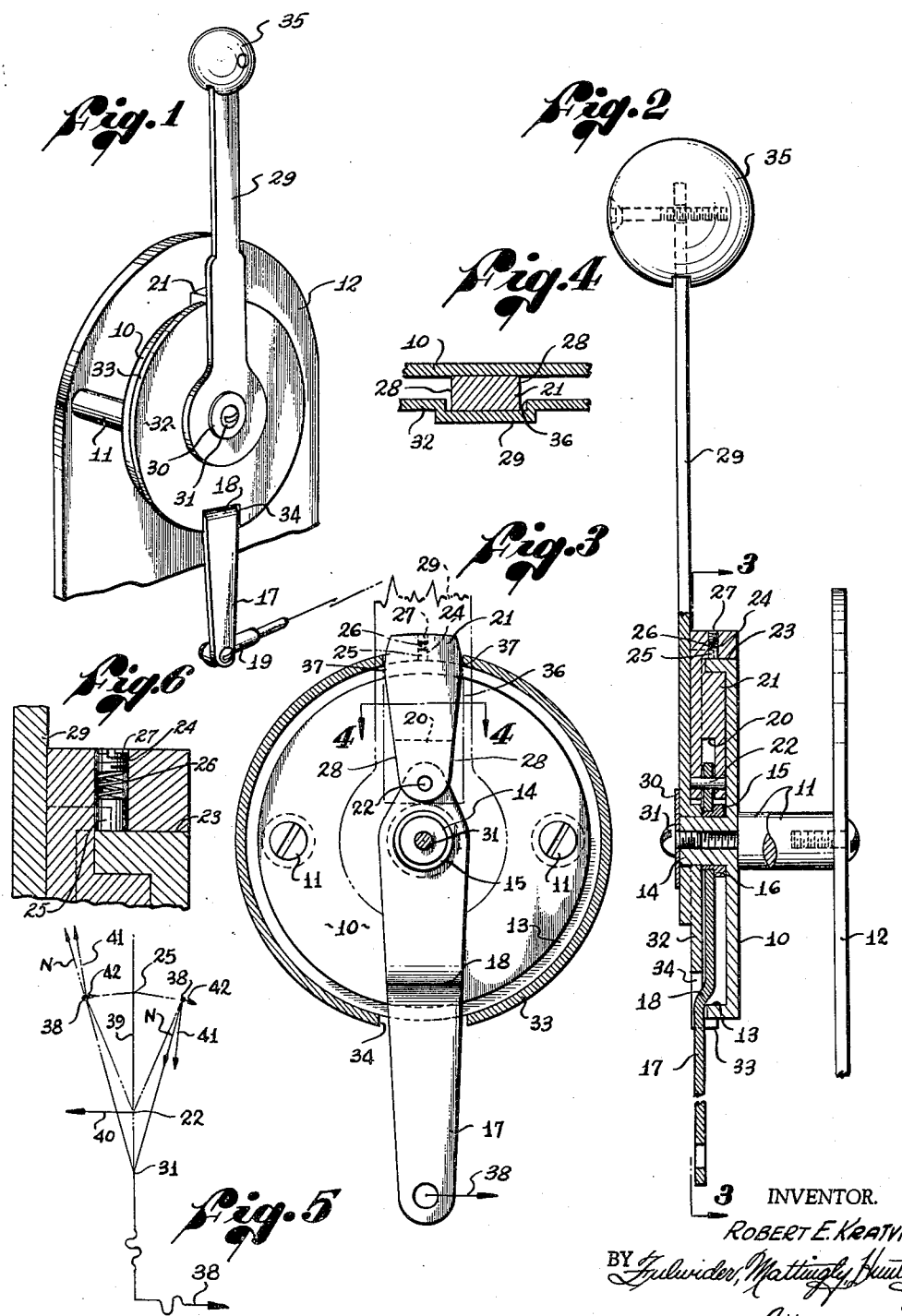

3,008,346
IRREVERSIBLE LINKAGE
Robert E. Kratville, Torrance, Calif., assignor to
Eugene E. Poncel, Burbank, Calif.
Filed Jan. 16, 1958, Ser. No. 709,394
12 Claims. (Cl. 74—531)

The present invention relates generally to control devices and the like and more particularly to an irreversible control mechanism.

Various combinations of simple levers, links and pulley wheels are commonly used as restrained kinematic chains. For example, in the aircraft industry, mechanisms of this type are utilized in controlling the setting of engine throttles, wing flaps and other devices. Such mechanisms are also utilized in seat adjustment controls and rail locks, a familiar example of the latter being a transom window lock.

An object of my invention is to provide a control mechanism of this general type which is irreversible in the sense that a force applied to the input of the mechanism is transmitted to a load or resistance which is thereby overcome with a definite and restrained motion, whereas any force applied to the output of the mechanism when no input force is applied serves only to lock the mechanism in its then position. Thus, when a force is applied to the input of the mechanism, the mechanism acts as a restrained kinematic chain, but when a force is applied to the output of the mechanism, the mechanism acts as a locked kinematic chain.

Another object of my invention is to provide a control mechanism that is bidirectional in locking effect so that any force applied to the output thereof is resisted irrespective of the direction of its application to the output.

A further object of the invention is to provide a control mechanism with a positive instantaneous locking action so that no backlash is transmitted to the input as a result of force applied to the output.

Yet another object of the invention is to provide a control mechanism in which the force with which the mechanism is locked against movement increases with the force applied to the output.

A still further object of the invention is to provide a control mechanism having a single unitary member which acts as a bidirectional latch, thus eliminating the pair of unidirectional latches found in conventional control and locking mechanisms. In this connection my improved mechanism also eliminates the spring means usually found in prior mechanisms for yieldably maintaining the pair of unidirectional latches in latching position and also eliminates the means required for moving the unidirectional latches out of latching engagement as a preliminary to moving the input. With the present invention, a force can be applied to the input which is immediately transmitted to the output without first releasing the bidirectional lock means.

Another object of the invention is to provide an irreversible control mechanism that is movable throughout 360 degrees.

These and other objects and advantages of the invention will be apparent from the following description of a presently preferred embodiment thereof when taken in conjunction with the annexed drawing in which:

FIGURE 1 is a perspective view of a control mechanism embodying my invention;

FIGURE 2 is a sectional view of the mechanism illustrated in FIGURE 1 taken along the longitudinal axis thereof;

FIGURE 3 is a sectional view taken along the line 3—3 of FIGURE 2;

FIGURE 4 is a partial sectional view taken along the line 4—4 of FIGURE 3;

FIGURE 5 is a vector diagram explanatory of the operation of the mechanism; and

FIGURE 6 is a sectional view, on a larger scale, of a part of the mechanism.

For simplicity I have illustrated an embodiment of the invention in which the input comprises a lever or handle pivoted for rotation about the same center as an output lever or link and in which the locking action takes place against a circular track. It will, however, be evident to those skilled in the art that the invention can readily be adapted for locking action against a straight track.

Referring now to FIGURES 1 and 2, a base member 10 is rigidly secured, as by fastener means 11, to a support 12, which may be a pilot's control pedestal or the like. Base 10 takes the form of a disc having a peripheral cylindrical flange to define a circular track 13 and at its center is formed with a tapped boss 14. A spacer washer 15 is rotatably mounted on boss 14 that has an annular shoulder 16 adapted to seat a load link 17 through a complementary bore. An offset 18 is formed in the link 17 to clear the track 13 and the extreme outer end of the link is pivotally connected by suitable means 19 to the load or device to be controlled by the mechanism.

The inner end of link 17 extends beyond the center of base 10 a predetermined distance to be received within an open end slot 20 formed in the inner end of a shoe 21. A pin 22 extends through the shoe 21 and the end of link 17 within slot 20 to provide a pivotal connection therebetween.

At its outer end the shoe 21 on its inward face (i.e. its right hand face as viewed in FIGURE 2) is formed with a slot 23 that slidably receives and closely embraces the track 13, slot 23 having a curvature and width compatible with the radius of track 13 and the width thereof. Extending outwardly from communication with the slot 23 along the longitudinal center line of shoe 21 is a tapped bore 24 that slidably houses a friction element 25, preferably in the form of a pin. In order to hold element 25 in sliding contact with the outer face of track 13, bore 24 pockets a light spring 26 compressed between element 25 and a set screw 27 in the outer end of bore 24.

Referring now to FIGURE 3, it will be seen that the shoe 21 in plan view is tapered, the opposite sides 28 thereof converging inwardly towards a rounded apex. Shoe 21 is preferably formed so that its widest part is disposed immediately over the track 13, the sides 28 at the widest portion of shoe 21 developing into rounded surfaces.

Also journaled on the boss 14 is the inner end of a lever 29 which extends radially beyond track 13 in a direction diametrically opposite to the direction of the link 17. Both the link 17 and lever 29 are held assembled on boss 14 by a washer 30 mounted on a screw 31 in the tapped bore of boss 14. In order to protect the moving parts of the mechanism a cover plate 32 is carried by lever 29 and provided with an annular flange 33 adapted to receive track 13 therein. A suitable peripheral opening 34 is formed in cover plate 32 through which the offset portion 18 of link 17 extends without contacting the sides of the opening 34. The free end of lever 29 is provided with a handle 35 for convenient manual application of an input force.

A driving engagement between shoe 21 and lever 29 is provided by means of a slot 36 formed in cover plate 32 immediately under lever 29. The slot 36 is indicated in phantom outline in FIGURE 3 and it will be noted that it is of a uniform width adapted to acieve line contacts 37 with the opposite sides of shoe 21 at the widest portion of the shoe, the contacts 37 preferably occurring immediately above track 13.

When it is desired to move a controlled or driven member (not shown) through means 19 connected to the outer end of the link 17, the lever 29 by means of manual pressure on handle 35 is moved in the desired direction to achieve a corresponding movement of the link 17. As is apparent, the shoe 21 is restrained in a circular path by its slot engagement with the track 13. Inasmuch as the lever 29 contacts the shoe 21 at contact lines 37 immediately adjacent track 13, the force which moves shoe 21 around track 13 is directed substantially tangentially of track 13 whereby the shoe 21 has very little tendency to rotate into binding engagement with the track 13. The shoe 21 is thus placed in tension to pull on the pin 22 and thus carry the link 17 along.

After the control mechanism has been adjusted to the desired position and manual pressure relieved from handle 35, any tendency of the load or back pressure at the output end of link 17 to move link 17, is immediately resisted by a binding engagement of shoe 21 with track 13. Assuming a counter-clockwise force to be applied to the output end of link 17 as indicated by the directional arrow 38, a corresponding but oppositely directed force is thereby applied to the inner end of shoe 21 through the pin 22. The effect of the force of this moment at the axis of pin 22 is to immediately bind the shoe 21 against track 13 with a frictional force so great as to resist any force resulting from the initially applied load 38 which would tend to slide shoe 21 on track 13. This operation will be apparent from an examination of FIGURE 5.

In FIGURE 5 the axes of the fastener 31 and pin 22 are represented by the corresponding numbers while opposite line points of contact between the shoe slot 23 with the track 13 are represented as indicated at the numerals 38. The neutral axis or axis of symmetry of the aligned link 17, lever 29 and shoe 21 is indicated by the numeral 39 and intersects the track 13 at point 25 which corresponds to the contact of friction element 25 with track 13.

Assuming a given force represented by vector 38 is applied to link 17 at its outer end, a corresponding but oppositely directed force is applied at the axis 22 to the inner end of shoe 28, this force being represented by the vector 40. The force 40 tends to pivot the shoe 21 in a clockwise direction, as view in FIGURE 5, about the friction point 25 and produces a moment which is the product of the force 40 and the distance between the axis 22 and point 25. This tendency of the shoe 21 to rotate about the point 25 is inhibited by the engagement of the shoe 21 at lines 38 with the track 13. The force 40 is thus balanced by two reaction forces 41 at the lines 38 which produce counter moments each divided between the lines 38 and at each line 38 produces a force 41 equal to one half of the moment of the force 40 relative to the point 25. Considered as a resultant, each force 41 can be converted into a component N in a direction normal to the track 13 and a component 42 parallel to track 13. The frictional resistance to any sliding movement of shoe 21 on track 13 is thus the product of the sum of the two forces N and the coefficient of friction of the materials used. The geometry is such that the ratio of tangential force 42 to the normal force N is less than the coefficient of friction K so that the frictional resistance produced by the forces N and the coefficient of friction of the materials used is always greater than the sum of the forces 42, whereby the shoe 21 is firmly locked to the track 13.

I have found that, although it is preferable to use the friction element 25 to serve as a pivot for shoe 21, the mechanism will function without it. However, the use of the friction element 25 is desirable inasmuch as it also provides a means of compensating for wear between the parts so that the mechanism can at all times be maintained in a condition wherein the shoe 21 will immediately lock onto the track 13 in response to any back pressure imposed on the output end of the link 17.

With the shoe 21 thus locked on track 13, the mechanism will nevertheless respond immediately to the application of force to handle 35 when it is desired to adjust the device controlled by the mechanism. Assuming the locked condition shown in FIGURE 5, if a force is applied to handle 35 to move shoe 21 in a clockwise direction movement will occur when this force and the sum of the forces 42 overcome the resistance offered by the force 38 and the force of the friction lock (2KN). If the force applied to handle 35 is in counterclockwise direction, corresponding movement will occur when this force overcomes the force of the friction lock and the forces 42, after which the force 38 aids the force applied to handle 35.

I have observed that the lines of contact of lever slot 36 with the shoe 21 may be located otherwise than immediately above the track 13. However, it will be apparent that the greater the distance between the track 13 and such lines of contact the more difficult it will be to urge the shoe 21 into movement around the track 13 in response to the application of a force to the handle 35 of lever 29.

While I have shown and described herein but a single embodiment of my invention, it will be apparent to those skilled in the art that a great many variations are possible. It is to be understood, however, that I do not mean to be limited to the embodiment shown and described except insofar as defined in the following claims.

What is claimed is:

1. An irreversible control device for moving a load in accordance with an input force and holding said load against movement by forces other than said input force, comprising: a base; an arcuate track means fixed on said base and having a given radius of curvature; an input lever having a portion near one end adapted for the application of said input force to said lever; pivot means near the other end of said input lever mounting the same for angular movement about a principal axis concentric with said track means; an output lever having one end adapted for connection to said load; means pivotally mounting said output lever on said base for angular movement about said principal axis, said last-named means disposing said principal axis at a location intermediate the ends of said output lever; a one-piece shoe pivotally connected at one end to the other end of said output lever at a location disposed between said principal axis and said track means and at a given distance from said track means, said shoe having at the other end a portion bidirectionally drivingly engaged by said input lever at a location spaced from said principal axis a distance substantially equal to said radius of curvature, said shoe and input lever having direct driving engagement for immediate co-movement when said input force is applied and said shoe having an arcuate slot receiving and closely slidably embracing the opposite inside and outside surfaces of said track means to guide said shoe for movement along said track means in immediate response to movement of said input lever, the length of said slot being slightly less than twice the product of said given distance by the static coefficient of friction between said shoe and said track means, whereby movement of said input lever moves said shoe and coupling member along said track means and so moves said output lever, whereas forces otherwise applied to said output lever tending to move the same apply a torque to said coupling member tending to pivot the same about a point on said track means, and so develop at the points of engagement of said shoe with said track means frictional forces sufficient to prevent movement of said output lever.

2. An irreversible control device comprising: an arcuate track; a shoe bidirectionally slidably embracing said track; means in direct driving engagement with opposite sides of said shoe immediately adjacent said track to apply an input force in the direction of said track; and a load member mounted for rotation about an axis coinciding with the geometric center of said track and pivotally connected to said shoe intermediate said center and said track at an axis located on a radius of said track equally dividing the arc subtended by the slidably embraced surface of said track, whereby an input force applied to said shoe at said track induces movement of said shoe and load member, and a load applied to said load member, in the absence of an input force, induces binding engagement of said shoe and track to prevent movement of said load member.

3. An irreversible control device comprising: a base; an unitary shoe; cooperating arcuate track and slot engagement means of predetermined chordal length formed on said base and shoe to slidably restrain said shoe for movement in an arcuate track on said base; means in direct driving engagement with opposite sides of said shoe immediately adjacent said track to apply an input force in the direction of said track; a load member mounted for rotation about the axis of said track and slot means and pivotally connected to said shoe at an axis between said axis of rotation and said track and slot means with said pivotal axis being located equidistantly with respect to opposite ends of said chordal length whereby an input force applied to said shoe adjacent said slot and track means moves said shoe and said load member, and a load applied to said load member in either direction, in the absence of an input force, induces toggling of said pivotal axis to urge said cooperating means into forceful frictional engagement with one another to prevent movement of said load member.

4. An irreversible control device comprising: an arcuately extending track; a shoe formed with a track-receiving slot complementary to said track having a predetermined chordal length, opposite sides of said track being slidably embraced by opposite sides of said slot substantially throughout the length of said slot; means in direct driving engagement with opposite sides of said shoe immediately adjacent said track to apply an input force in the direction of said track; a load member mounted for rotation about the geometric center of said track and pivotally connected to the inner end of said shoe at an axis between said center and said track that is equidistant from opposite ends of said slot, whereby an input force applied to said shoe moves said shoe and said load member, and a load applied to said load member from either direction, in the absence of an input force, causes substantially diagonally disposed portions of said shoe slot to forcefully engage opposite sides of said track in response to toggling tendency of said axis to lock said load member against movement; and a friction element carried by said shoe in radial alignment with the pivotal connection of said shoe and load member and in communication with said track-receiving slot and having a means to bias said element into slidable contact with one side of said track.

5. A device as set forth in claim 4 in which a predetermined angle is defined by said chordal length and said axis that will resolve the force of said load at each of said forcefully engaged portions of said slot and track into a substantially tangential resultant and a substantially radial resultant, the product of the sum of said radial resultants and the coefficient of friction of the materials of said shoe and track being greater than the sum of said tangential resultants.

6. An irreversible control device comprising: an arcuately extending track; a shoe extending transversly of said track toward the geometric center thereof and having a slot adapted to closely slidably embrace opposite sides of said track to slidably restrain said shoe for movement along said track; an input member mounted for rotation about said center of said track and directly drivingly engaged, immediately adjacent said track, with opposite sides of said shoe for immediate co-movement of said shoe and input member in response to actuation of said input member in either direction; and a load member mounted for rotation about said center of said track and pivotally connected to the inner end of said shoe at a pivot axis equidistant from opposite ends of said slot whereby an input force applied to said input member forces said shoe and load member into corresponding movement, and a load applied to said load member, in the absence of an input force, toggles said shoe into forceful binding engagement with said track to prevent movement of said load member.

7. An irreversible control device comprising: an arcuately extending track; a unitary shoe having a slot formed therein complementary to said track whose confronting arcuate faces slidably embrace opposite sides of said track; a friction element resiliently mounted in said shoe for yieldable engagement with one of the sides of said track; an input member mounted for rotation about the geometric center of the track and drivingly engaged, at said track, with opposite sides of said shoe; and a load member mounted for rotation about said center and pivotally connected to said shoe between said track and said center whereby an input force applied to said input member moves said shoe and load member in a corresponding direction, and a load applied to said load member, in the absence of an input force, forces said shoe into binding engagement with said track to prevent movement of said load member.

8. A device as set forth in claim 7 in which said friction element engages said track at the midpoint of said slot and said pivotal connection is equidistant from the opposite ends of said slot, the chordal length of said slot and said pivotal connection defining a predetermined angle, whereby when said load is applied, substantially diagonally opposite portions of said shoe slot forcefully grip opposite sides of said track with a force of frictional resistance greater than resultants of said load directed tangentially of said track, said angle being adapted to resolve the force of said load at each of said forcefully engaged portions of said slot and track into a resultant disposed tangentially of said track and a resultant disposed substantially radially of said track, the sum of the tangential resultants being less than the product of the sum of the radial resultants and the coefficient of friction of the materials of said shoe and track.

9. An irreversible control device comprising: a base formed with a cylindrical flange defining a track; a shoe formed with an arcuate slot slidably embracing opposite sides of said track throughout the length of said slot to be restrained for movement along said track, the opposite sides of said shoe converging generally radially inwardly of said track to an apex portion that terminates outwardly of the geometric center of said base, and said shoe being symmetrical with respect to a radius of said base whereby said slot extends equally on opposite sides of the longitudinal center line of said shoe; an adjustable, resiliently-mounted friction element in the outer end of said shoe adapted to yieldably engage the outside of said track at the midpoint of said slot; an input lever pivotally mounted on the center of said base and formed with an elongate slot having opposite sides in driving engagement with the opposite sides of said shoe along lines of contact immediately over said track; and an output lever pivotally mounted on the center of said base, and having one end pivotally connected to the apex portion of said shoe along the longitudinal center line of said shoe, the other end of said output lever being adapted for connection to a load.

10. A control device comprising: an input lever means; an output lever means; a base supporting both said lever means for angular movement about a common principal axis; an arcuate track on said base concentric with said principal axis; and a shoe formed with a passage closely slidably embracing radially inner and outer opposite sides of said track and having a portion extending radially inwardly from said track, said input lever means being adapted for bi-directional direct driving engagement wtih opposite sides of said shoe adjacent said track, said shoe on its inner end at a location between said principal axis and said track having a pivotal connection with said output lever means whereby both said lever means and shoe are constrained for concurrent immediate movement about said principal axis in response to an input force applied to said input lever means to move a load on said output lever means, whereas forces otherwise applied to said output lever means tending to move the same apply a torque to said pivotal connection to cause chordally spaced-apart portions of said passage on opposite sides of track to bind on said track.

11. A control device as set forth in claim 10 in which at least one of said lever means comprises a bar lever having its longitudinal axis aligned with said principal axis, said pivotal connection, and the mid-point of said passage, with said pivotal connection being disposed equidistantly from opposite ends of said passage.

12. A control device as set forth in claim 10 in which said track is endless and said passage of said shoe embraces less than the entire cross section of said track to be movable throughout 360 degrees in response to an input force applied to said input lever means.

References Cited in the file of this patent
UNITED STATES PATENTS

| | | |
|---|---|---|
| 245,959 | Johnson et al. | Aug. 23, 1881 |
| 575,521 | Hart | Jan. 19, 1897 |
| 588,598 | Parsons | Aug. 24, 1897 |
| 607,749 | Jackson | July 19, 1898 |
| 771,490 | Palmer | Oct. 4, 1904 |
| 803,046 | Bjorneby | Oct. 31, 1905 |
| 980,008 | Romines | Dec. 27, 1910 |
| 1,043,206 | Custer | Nov. 5, 1912 |
| 1,156,961 | Witherbee | Oct. 19, 1915 |
| 1,963,444 | Mullins | June 19, 1934 |
| 2,088,880 | Strange | Aug. 3, 1937 |
| 2,195,313 | Jandus | Mar. 26, 1940 |
| 2,256,934 | Adcox | Sept. 23, 1941 |
| 2,427,103 | Hettinga | Sept. 9, 1947 |
| 2,440,630 | Blocker | Apr. 27, 1948 |
| 2,458,446 | Suska | Jan. 4, 1949 |
| 2,534,729 | Panish | Dec. 19, 1950 |
| 2,631,704 | DeWiess | Mar. 17, 1953 |
| 2,654,445 | Oetzel | Oct. 6, 1953 |
| 2,664,015 | Moore | Dec. 29, 1953 |
| 2,703,499 | Reid | Mar. 8, 1955 |
| 2,854,109 | Kile et al. | Sept. 30, 1958 |
| 2,867,133 | Ewing | Jan. 6, 1959 |

FOREIGN PATENTS

| | | |
|---|---|---|
| 46,227 | Switzerland | Oct. 15, 1908 |
| 810,787 | France | Jan. 6, 1937 |
| 24,257 of 1908 | Great Britain | Nov. 11, 1909 |
| 25,211 of 1908 | Great Britain | Nov. 23, 1909 |